United States Patent [19]
Bravin

[11] 3,861,232

[45] Jan. 21, 1975

[54] TRANSMISSION MEMBER UTILIZING PIVOTALLY INTERCONNECTED PREFORMS

[76] Inventor: Ben Bravin, 215 W. 88th, New York, N.Y. 10024

[22] Filed: Oct. 5, 1973

[21] Appl. No.: 404,132

[52] U.S. Cl. .............................. 74/446, 74/243 DR
[51] Int. Cl. ...................... F16h 55/30, F16h 55/12
[58] Field of Search........ 74/243 DR, 447, 448, 446

[56] References Cited
UNITED STATES PATENTS

| | | | |
|---|---|---|---|
| 1,433,923 | 10/1922 | Anthony | 74/448 |
| 3,069,922 | 12/1962 | Harvey | 74/243 DR |
| 3,108,488 | 10/1963 | Huszar | 74/447 X |

*Primary Examiner*—Leonard H. Gerin
*Attorney, Agent, or Firm*—Ralph R. Roberts

[57] ABSTRACT

This invention pertains to transmission members such as gears, timing belt pulleys, toothed racks and like power transmitting mechanisms in which a toothed member is driven by or drives a cooperative means. A base member is provided and usually is a formed blank such as a disc or a length of metal to which is secured assembled preforms in linked array, each preform providing a gear tooth or tooth receiving profile. The linked preforms are tightly retained on the previously prepared base member. Any selected number of preforms is used to precisely accommodate the support blank to which the preforms are secured. The support blank may be regular or irregularly shaped depending on the desired resulting transmission member.

24 Claims, 21 Drawing Figures

TRANSMISSION MEMBER UTILIZING PIVOTALLY INTERCONNECTED PREFORMS

BACKGROUND OF THE INVENTION

1. Field of the Invention

With reference to the classification of art as established in the United States Patent Office this invention is found in the general Class entitled, "Machine Elements and Mechanisms" (Class 74) and more particularly in the subclass entitled, "gearing-roller" (subclass 465).

2. Description of the Prior Art

Spur gears, toothed pulleys, gear racks, timing belts, roller chains and sprockets are all well known in the power transmission art. These items are characterized as to size, type, capacity, etc. and can usually be bought from a supply catalogue through a dealer. Where the required item is conventional and is classed as a "standard", rapid procurement is generally available as an "off-the-shelf" item of the dealer. Where the item is not a generally stocked conventional item the procurement of the item is often very difficult. For the manufacturing plant operating on an "around-the-clock" schedule the maintenance department often is unable to make a fast repair if a replacement item is not in off-the-shelf supply. In many instances the power transmission portion of a processing machine requiring replacement of a gear or toothed pulley may require an extensive tear down and reassembly even where the part is readily available. Ready repair or replacement without extensive disassembly is highly desirable.

In many instances the designer of a new machine desiring to make a gear, toothed pulley, an irregular gear or rack member finds that the making of the blank and then cutting the needed profiles often requires months to secure such a transmission member. The equipment for making unconventional transmission members is sometimes nearly unavailable or the cost of making such a member is unacceptable to the user.

The use of a length of roller chain mounted to a support blank is shown in U.S. Pat. No. 3,108,488 to Huszar as issued on Oct. 29, 1963. In this and prior known art, insofar as is known, no attempt has been made to provide a gear or a timing belt pulley in which the retention is positive and the pitch line and spacing is positive and precise.

The present invention provides a ready and inexpensive means for making and assembling positive drive pulleys such as timing belt pulleys or spur gears. Preformed teeth or groove members which are precisely spaced from each other by connecting links or extended pivot ears are supported by and are retained on a suitable support blank so that the preform is secured at a required relationship to the support surface. In one embodiment a tooth preform member is precisely formed with a support means adapted to rest on the prepared surface of a support blank so that in a secured condition an established pitch line is maintained and the adjacent preform members are maintained in a similarly fixed and spaced relationship. A series of preforms when secured to the support blank provides a complete gear. Other preforms with configurations adaptable to toothed pulleys, racks or the like may be assembled in a similar manner to provide a transmission member.

SUMMARY OF THE INVENTION

This invention may be summarized at least in part with reference to its objects.

It is an object of this invention to provide, and it does provide, transmission members such as positive drive pulleys, gears and the like wherein preforms having a tooth or groove profile are precisely spaced from each other by pivoting means or attached link members and to a support member by means of securing pins or a frictional engagement.

It is a further object of this invention to provide, and it does provide, transmission members such as a positive drive pulley, gear, rack and the like wherein a precise preform having a tooth or groove profile is series connected to a plurality of like preforms by means of like connecting means. A selected number of these preforms is secured to a shaped support member so that a precise pitch line is established and maintained in the assembled transmission member. Except for being an assembled unit the positive drive member performs as does one made from solid material.

The positive drive member of this invention utilizes a preform which may have a tooth or a channel formed on its outer face. The underside of this preform is precisely made so as to engage and be positively positioned on a support surface and with one of several shown embodiments is retained on this support surface. These preforms are precisely spaced by means of connecting means or links so that the resulting drive member has a multiplicity of like preform drive units secured to the support member. This support member may be a disc, a cam-shaped member, irregular or regular form or a rack support which is dependent upon whatever the desired final drive member configuration is to be. This support is formed to provide a base for the preform at a desired pitch and configuration line. In several of the embodiments, to be hereinafter more fully described, the preform is secured to the support member by means of a pin, an orienting pin, a locating pin and in certain applications by forcing into an attached, resilient receiving surface.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of a preform having a cavity formed to receive a tooth of a timing belt and also a preform having a tooth profile, both preforms are adopted for use on a support member and several means for attachment to this support member are shown.

These specific embodiments and alternate embodiments thereof have been chosen for the purposes of illustration and description as shown in the accompanying drawings wherein:

In the following description and in the claims various details will be identified by specific names for convenience, these names, however, are intended to be generic in their application. Corresponding reference characters refer to like members throughout the several figures of the drawings.

The drawings accompanying, and forming part of, this specification disclose a preferred construction but it should be understood that these details may be modified in various respects without departure from the concept and principles of the invention.

Figure 1:
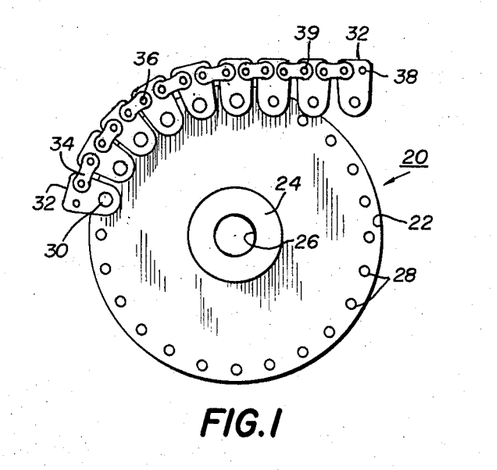
FIG. 1 represents a side view of a connected series of a plurality of like preforms in which the preforms are depicted as being in the process of being attached to a support member.

DESCRIPTION OF THE EMBODIMENTS OF FIG. 1

Referring now to the drawings and in particular to FIG. 1, there is depicted a support member 20, which as shown, is a disclike member preferably made with an outer diameter or periphery 22 of a precise measurement. A hub 24 is provided in this member 20 and has a bore 26 of a selected size for mounting on a shaft, not shown. Precisely spaced and positioned at a determined distance in from the outer periphery 22 is a multiplicity of holes 28 which are sized so as to snugly receive and retain locking pins or rivets 30 in a manner to be hereinafter more fully described. A series of preforms 32 which may have a tooth profile, a receiving groove or other desired driving configuration is pivotally retained in a selected spaced relationship to an adjacent preform by link member 34. These link members are usually substantially identical with one end pivotally secured by a retaining pin 36 to a preform 32 and the other end to an adjacent preform by means of a like retaining pin 36.

Figure 7:
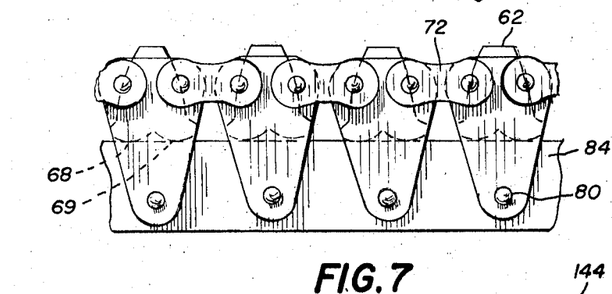
FIG. 7 is a fragmentary side view of an assembly in which the preforms are tooth members like the preform of FIG. 6, these linked members being assembled to a straight support member to form a rack.

Preform as used herein is a general term for a unit member which may be a gear tooth, a sprocket tooth or a timing belt trough unit or other drive unit where like configurations are repeated. The preforms 32 are series assembled usually with like connecting link members 36 to form a length of like unit members. A selected number of preforms are then secured to the support member by the fastener means 30, usually drive pins. This basic concept permits making a complete gear, pulley or as also shown in FIG. 7 may be a rack member. The configuration of the periphery of the support member establishes the resulting drive or driven member such as a gear pulley, etc. When the desired number of preforms have been secured to support member 20 they are drawn tightly together and into a hole 38 and by a retaining pin 39 the preforms are retained as a closed connected unit.

Figure 2:
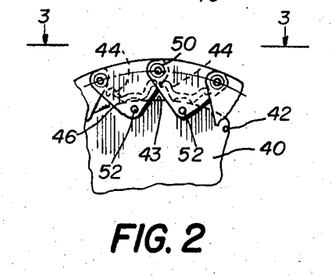
FIG. 2 represents in a slightly enlarged scale a fragmentary view showing one embodiment of a support member on which a series of trough groove preforms with integral linkages are attached to provide a toothed pulley.
Figure 3:
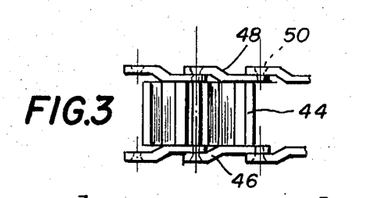
FIG. 3 represents a plan view showing an arrangement of connected groove link preforms as seen in FIG. 2, this view taken on the line 3—3 thereof and looking in the direction of the arrows.
Figure 4:
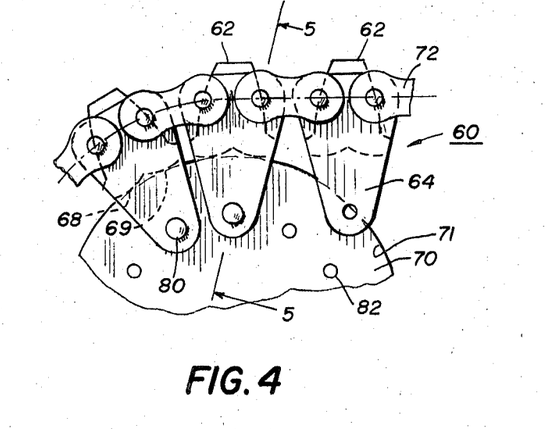
FIG. 4 represents a fragmentary side view in an enlarged scale showing a support member with a series of tooth profile preforms partially attached and in the process of being attached thereto.

EMBODIMENT OF FIGS. 2 AND 3

Referring next to FIGS. 2 and 3, there is depicted a series of connected preforms in which the side portions of the preforms also provide the link connection members thus eliminating the need for separate connecting links such as member 34 in FIG. 1. As seen in FIGS. 2 and 3 a support member 40 which may be a disclike member such as support member 20 in FIG. 1 is provided with a pattern of regularly spaced precisely positioned holes 42 which are inward of the periphery 43 of this base member. A preform trough member 44 may be a stamping made of sheet metal or the like or may be a cast shape and by brazing, soldering, etc. be attached to side plates 46 and 48. If desired, the preform and side members may be a unitary cast member. As viewed in FIG. 2, the near side plate is identified as 46 and as seen in FIG. 3 the far side plate is identified as 48. These side plates are made with their leftward upper ends as an ear portion which is offset from the regular or general plane of the side member. This offset is just sufficient for the offset outer ear portion to overlap the planer ear portion extending from the other end of the side plate member. By means of pins or rivets 50, entering holes formed in the overlapped ear portions are pivotally and sequentially connected with a side plate 46 to a like side plate 46 and in a mirror-like relationship with side plate 48 to a like side plate 48.

The lower portion of side plates 46 and 48 is made so as to extend below the exactly formed lower supporting surface of the preformed portion 44. The inner faces of the extending lower portions of the side plates are spaced so as to slidably engage the sides of the support base member 40. Formed in each of these lower extending portions of the side plates are holes 52 which are adopted to be aligned with holes 42 in the base member 40. By means of rivets, not shown, the side plates are secured to the support member 40 with the undersurface of the preform 44 snugly resting on the periphery 43. Whether the preform 44 is a trough member, a tooth member for a gear or the like or some other drive unit, the forming of an offset ear portion in the side plates so as to lay in an overlapped engagement, as seen in FIG. 3, has both advantages and disadvantages. It has the advantage of requiring less actual parts but has the disadvantage in that it limits or restricts the construction of the sequential members to the precise positioning as established by the holes in the ears into which the rivets 50 are mounted. Therefore, the pre-established spacing of the preforms using this or a like embodiment does not permit the spacing variations obtainable when separate side plates are provided and used.

DESCRIPTION OF THE EMBODIMENT OF FIGS. 4, 5, 6 and 7

In FIGS. 4, 5, 6 and 7 there is shown a preform provided with a gear tooth portion. This depicted preform 60 has a tooth form 62 and either integrally cast or attached side plate portions 64 and 66. When fixedly attached the side plates are actuated as by soldering, brazing, welding or other means. As particularly seen in FIG. 4, the underside of the tooth formed portions 62 is configured with arcuate surfaces 68 and 69 which are sufficiently arcuate to establish a precise two point or line contact seating position of the preform on a support member 70 and in particular on the periphery or outer support surface identified as 71. This support surface and the arcuate surfaces 68 and 69 of the preform are precisely positioned in accordance with the construction of the tooth profile so that when a series of preforms are securely mounted on the support member 70 the tooth form will establish a desired pitch line in the resulting gear or sprocket. The spacing of one tooth to the next adjacent tooth is established and maintained by means of side links 72, which links are typically provided with rivet engaging and retaining holes 73 and 74 formed therethrough. Through these holes in the side links a rivet or drive pin 75 is passed so as to enter and be secured in holes 76 formed in side plate portion 64 or side plate portion 66. The lower portion of each side link has holes 78 formed therein. These holes are a selected precise distance below the arcuate support surfaces 68 and 69. These side links are secured to the support member 70 by means of rivets or drive screws 80 which enter and are secured in holes 82 precisely positioned and formed in the support member.

Figure 5:
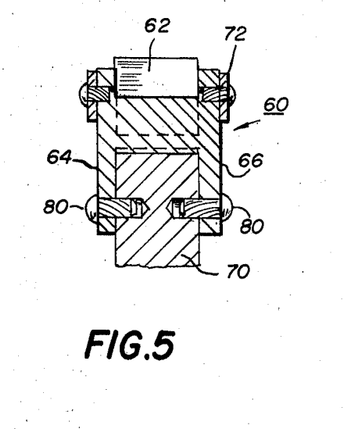
FIG. 5 represents a sectional view taken on the line 5—5 of FIG. 4 and showing the tooth-shaped preform and connecting links assembled to a support member.
Figure 6:
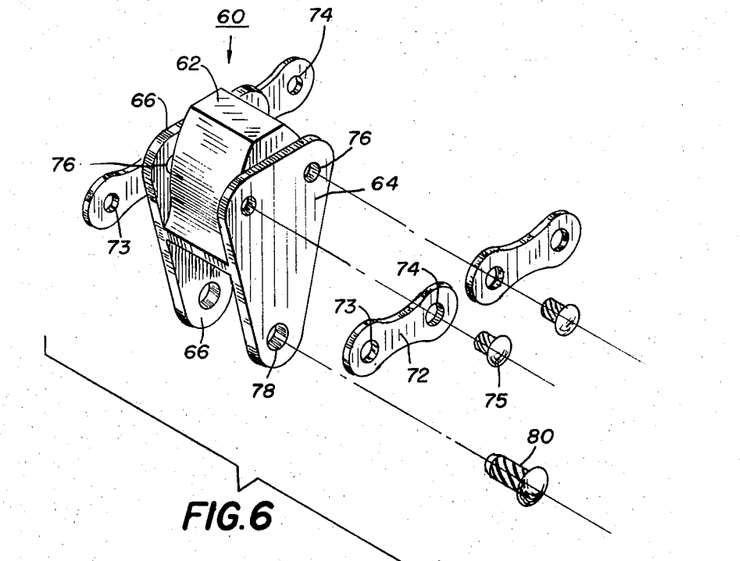
FIG. 6 represents an exploded isometric view showing the several components forming a link assembly in which the preform unit is a tooth member such as shown in FIG. 4.

As seen in FIG. 5, the preform 60 is made as an integral unit with side plates 64 and 66 cast with the tooth profile 62. This preform, as a part of connected series, is mounted on the support member 70 whose sides are sized so that the inner surfaces of the side plates 64 and 66 slidably engage the sides of the support. The drive pins or rivets 80 as they secure the preform 60 to the support member cause the arcuate surfaces 68 and 69 to be drawn to and snugly engage the periphery 71. Links 72 have a selected determined length between holes 73 and 74 and by means of rivets 75 which secure the links to the outer portions of the tooth profile at positions adjacent to the profile 62 establish a desired and precise spacing of the adjacent tooth forms.

As seen in FIG. 7, a series of tooth profile preforms 60 may be secured to a linear support member 84 and by means of pins 80 the tooth profile preforms are secured to the rectangular support 84. These tooth preforms 62 are maintained in a precise spacing by means of links 72 and by means of the arcuate support surfaces 68 and 69. Each tooth preform is secured at three points by means of the pin 80 and the two arcuate support surfaces 68 and 69 and by this method a rack member is provided.

Figure 8:
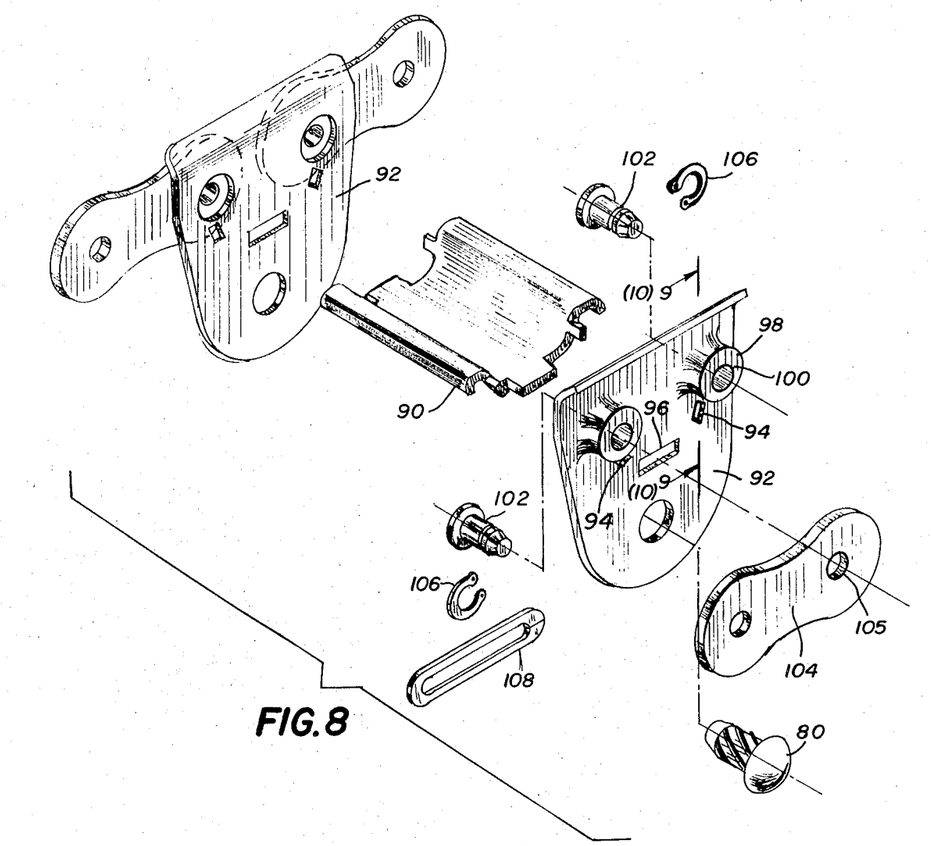
FIG. 8 represents an exploded isometric view showing the components of one link assembly in which the preform is a trough member.

EMBODIMENT OF FIG. 8

Referring next to FIG. 8, there is depicted a preform assembly which in an assembled condition and mounted on an appropriate support member provides a timing belt pulley or the like. As depicted, a groove member 90 may be either a cast member, an extrusion or stamped from sheet metal into the desired configuration. Side members 92 are contemplated to be stampings, forgings or castings which are preferably symmetrical around their center line so that they may be used on either the near or the far side. As depicted, there is provided in each side member a pair of receiving slots 94 and a central slot 96 into which cooperatively shaped and extending tab portions provided on channel member 90 are inserted. These extending tongue-like or tab portions are then secured either by staking, welding, soldering or swaging or the like. In these side plates are also formed receiving bosses 98 in which are provided holes or apertures 100 for the receiving and retaining of pivot pins 102. These pins may have a groove in their shank portion which is precisely positioned so that when a side link member 104 is placed against the pad 98 and the pin 102 is inserted from the inside and through a hole 105 in the side link 104 a snap ring 106 is mounted in the groove to retain the link in secured pivoted position. It is also contemplated that instead of ring 106 a split retainer 108 may be used to simultaneously secure two adjacent pins 102 in a retained position.

Figure 9:
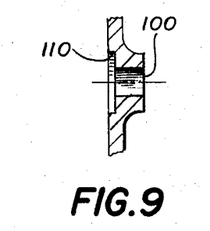
FIG. 9 is a fragmentary sectional view taken on the line 9—9 of FIG. 8 and showing one construction of the side plate member of the link assembly of FIG. 8.
Figure 10:
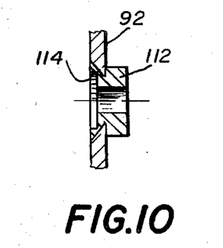
FIG. 10 represents a fragmentary sectional view taken on the line 10—10 of FIG. 8 and showing an alternate construction of the side plate member of FIG. 8.

EMBODIMENTS OF FIGS. 9 AND 10

As depicted in FIG. 9, the side plate 92 is made as a casting or forging and it is contemplated that the hole 100 be formed with a shallow recess 110 in which the head portion of the retaining pivot pin 102 is retained so that the head does not extend beyond the inner surface of plate 92. Where the side plate 92 is made of sheet metal, as in FIG. 10, it is contemplated that a hole will be formed therein into which a bushing 112 is pushed and staked so as to provide a shallow recess 114 for retaining the head of pin 102 in the manner of FIG. 9.

Figure 11:
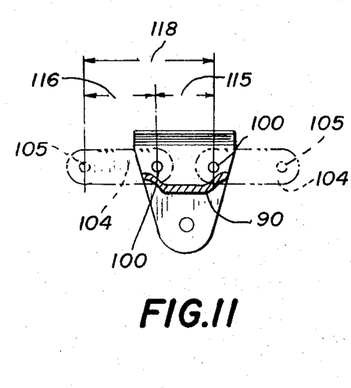
FIG. 11 represents a side view of an assembly such as the assembly of FIG. 8 and showing in phantom outline connecting links which are selected so as to space the trough preforms at selected intervals.

EMBODIMENT OF FIG. 11

In FIG. 11 an assembled preform such as seen in FIG. 8 is constructed with an established distance 115 between holes 100. However, the spaced distance from one trough preform 90 to the next preform is established by the distance 116 which is initially established and maintained by the distance between holes 105 in the links 104. For example, by changing the length 116 which is provided by the side link 104 the distance 118 which establishes the distance of one preform to the next preform is able to extend or shorten the distance of one preform 90 to the next preform 90. It is contemplated that a large selection of links 104 will be provided and the distance 116 establishing the spacing of the preforms will then be merely a matter of selection.

Figure 12:
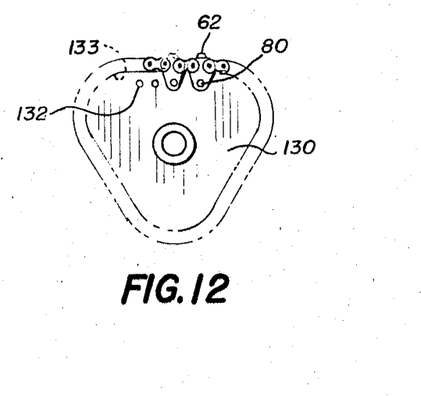
FIG. 12 represents a side view partly diagrammatic and showing a series of tooth members such as in FIG. 6 attached to a triangularly-shaped support member to provide a like triangularly-shaped gear.

EMBODIMENT OF FIG. 12

Referring next to FIG. 12, it is to be noted that a support member 130 may be made in an irregular shape as, for example, a triangularly-shaped member having radial corners. Upon this support 130 a series of tooth preforms 62 are positioned and secured by means of drive pins 80 inserted into holes 132 formed a precise distance in from the periphery 133. Elliptical gears or trough pulleys of any desired configuration may be used as long as the periphery profiles of the supports are maintained with straight planes or positive curves. This invention thus provides means for rapidly making a gear, toothed cam or pulley having other than regular profile configurations.

Figure 13:
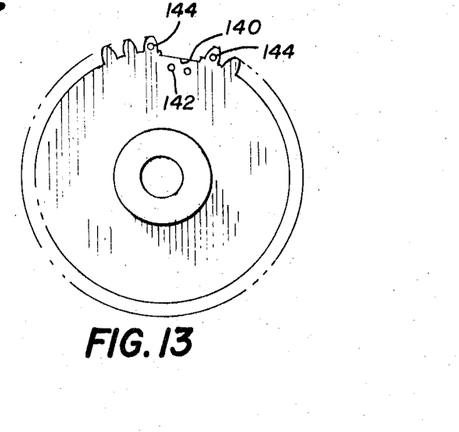
FIG. 13 represents a diagrammatic side view of a gear in which two of the regular teeth have been removed and the remaining gear member has been prepared to repair by the intended mounting thereto of preform portions with connecting links as in FIG. 6.

EMBODIMENT OF FIG. 13

Referring next to FIG. 13, it is to be noted that this invention also provides means for making a repair of a gear in which the loss of a few teeth, in said regularly formed gear, may be replaced with the mounting of one, two or more units including a preform and connecting links. The support member provided by the gear 136 which has lost its teeth or been damaged has the damaged portion machined or otherwise prepared to provide a precise support surface 140 and by a jig, template or other suitable means a required number of holes 142 are formed in the gear base. Those teeth adjacent the prepared support surface have holes 144 formed therein whereupon one, two or more of the required preforms are placed upon the support surface and by means of drive screws 80, side links 72 and retaining pins 75 the needed teeth are secured in place in the gear either as a permanent or a temporary measure enabling the gear to be used in the normal manner. This procedure may be followed particularly where the gear is to be repaired while in the machine or where a new gear must be specially scheduled and made.

Figure 14:
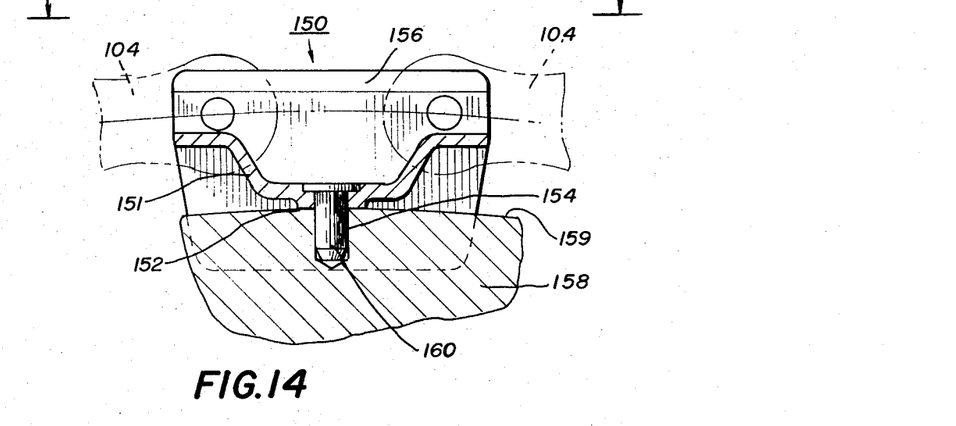
FIG. 14 represents a partial sectional side view showing an alternate method of attaching a trough preform to a support member.
Figure 15:
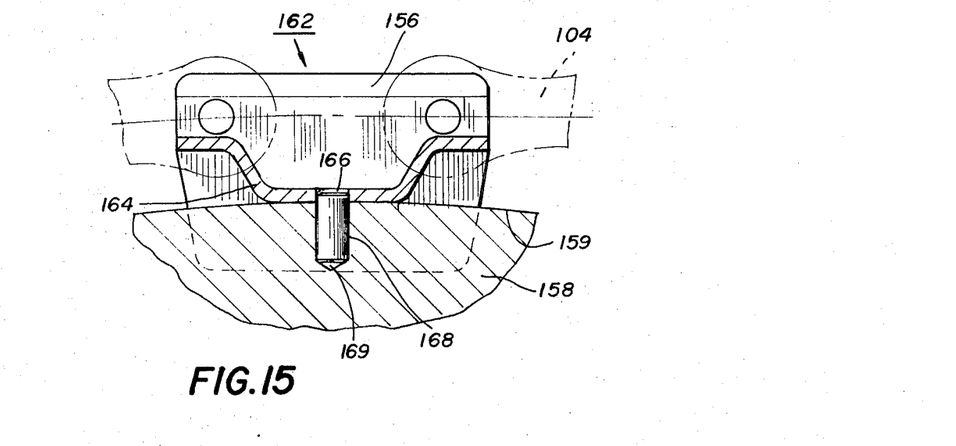
FIG. 15 represents a partial sectional side view like that of FIG. 14 and showing an alternate pin means for attaching a trough preform to a support member.
Figure 16:
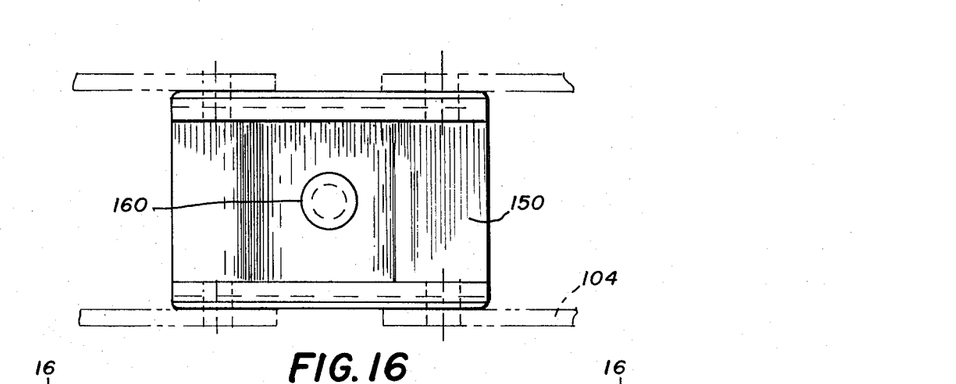
FIG. 16 represents a plan view taken on the line 16—16 of FIG. 14 and showing the attachment of the trough preform to the support member.

EMBODIMENT OF FIGS. 14, 15 AND 16

Referring next to FIGS. 14, 15 and 16, it is to be noted that the attachment of the side links to the support member is not necessary where other attaching means are provided. The securing means may be into the periphery of the support such as seen in FIG. 14 wherein the preform 150 has the trough member 151 designed so as to have a boss section 152 into which a stepped hole 154 is formed. Side links 104, as seen in FIG. 8, may be used to engage side plate portions 156 attached to trough member 151 of the preform. These side plates may be either an integral part of the preform or may be attached as in FIG. 8 or may be secured by soldering, brazing or welding. To mount the preform in the desired position on the support member 158 it is only necessary to drill holes in the outer periphery 159 and by means of headed pins or drive screws 160 secure the outer preform to the periphery. Not every preform of the series need be attached, for example, every other preform may be attached. It is only necessary that sufficient preforms be retained in a secure position so that they do not slip or shear the retaining pins after the preforms have been secured in an endless relationship.

In FIG. 15 an alternate preform has a trough member 162 which may have a substantially flat base portion 164 which is adapted on its underside to seat upon the periphery 159 of support member 158. Side plates 156, as in the trough member FIG. 14, are retained in spaced relationship by the link member 104. The trough member 164 has an aperture 166 formed in its base portion and into and through this aperture is driven a headless pin 168 which is driven below the upper surface of portion 164 and into a hole 169 in support member 158.

In both FIGS. 14 and 15 it is contemplated that the side plates 156 will slidably engage the sides of the support member 158 to provide more-or-less side retention. The pins 160 or 168 also resist side movement and where plural or stepped pulleys are made may provide all the side retention. The connected members are made into a very tight endless unit so that the channel forms or trough members 151 or 164 are in snug engagement with the base 158. Where a headless pin 168 is used as in FIG. 15, the connected preforms when separated at one connecting link may be "peeled off" for replacement. A chamfered edge on pin 168 permits a camming action to be used to install or reinstall a series of connected preforms on the support member 158. Each preform when mounted on the associated pin 158 is retained in position while the next preform is either mounted or removed.

Figure 17:
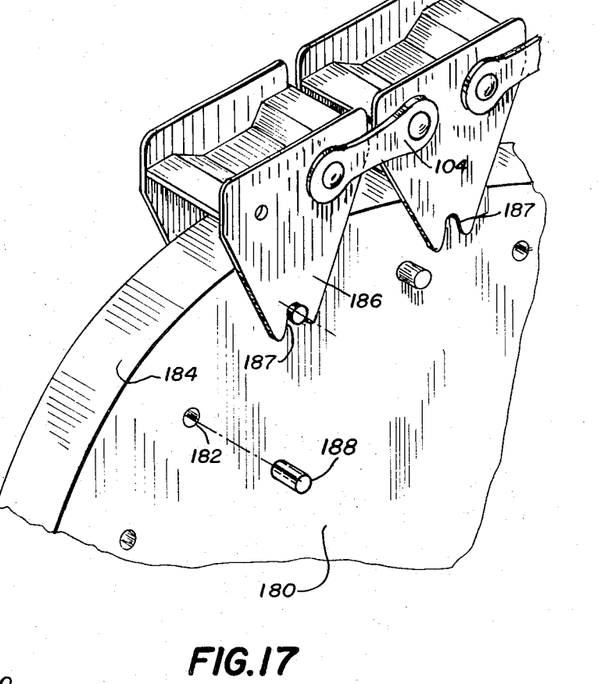
FIG. 17 represents a fragmentary isometric view of an alternate construction and assembly of the side plates of a preform in which a pin and slot is employed, and FIGS. 18A, B, C and D represent fragmentary side views showing yet another alternate construction for the positive positioning of the preform.

EMBODIMENT OF FIG. 17

Referring next to FIG. 17, there is depicted yet another means of securing the preforms to a support wherein a support member 180 is provided with a plurality of regularly spaced holes 182, which like holes 28 (FIG. 1), 42 (FIG. 2) and 82 (FIG. 4) are spaced a determined distance in from the periphery 184. As shown, the side plates 186 are formed with slots 187 which have their lower entering edges arcuately formed to provide camming surfaces adapted to engage the sides of an extending pin 188 mounted in hole 182. When the preforms are drawn tightly to the support 180 the pins 188 engage the sides of the slots 187 to prevent the preform from slipping along the periphery. The endless series of connected preforms as they are tightly drawn to the periphery 184 have each slot 187 brought into engagement with the cooperative pin 188. As the slot moves into seating condition on this pin the preform is cammed into tight alignment and position. With the mounting of the last preform to the support the last side link 104 is moved into position for connecting to side plate 186. In this condition the tightened endless loop will maintain the preform upon the support member and the pins 188 will prevent movement along the periphery. Whether the preform is a tooth, a channel member or some other configuration the groove 187 and pin 188 are adaptable to all prior shown and like embodiments.

Figure 18A:
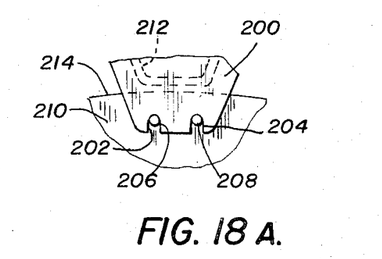

EMBODIMENTS OF FIGS. 18A, B, C AND D

Referring next and finally to the embodiments as shown in FIGS. 18A, B, C and D, there are depicted alternate support means wherein the positive positioning of the preform depends on pins or screws placed in the side portions of the support member. These pins or screws cooperate with slots and/or holes in the downwardly extending side plate portions of the preform to provide positive positioning of the preform. These embodiments show that the desired accuracy of positioning and spacing the preform need not depend on the periphery of the support member as depicted in FIGS. 1–17 but instead the preform may depend on support means such as shown in FIGS. 18A, B, C or D.

In FIG. 18A the preform has a side plate 200 in which are formed two arcuate slots 202 and 204. These are sized and spaced to snugly rest on and engage pins 206 and 208 mounted in support member 210 and extending from the side surfaces thereof. Like slots and pins are provided in the opposite side plate used with the preform and on the opposite side of the support member. The preform midportion 212 extending between the side plates 200 in the embodiment of FIG. 18A does not rest on the periphery 214 of the support member 210. The preform is supported by and precisely positioned by pins 206 and 208 and the tightened link means which draws the preform tightly to and on these pins. Where desired, the slots 202 and 204 may be deepened so that the underside of the preform does engage the periphery with one of more lines of contact.

Figure 18B:
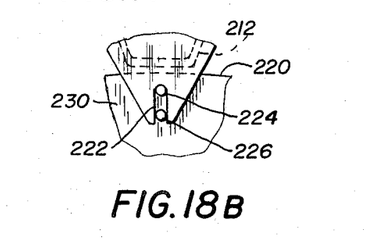

In FIG. 18B the preform 212 is connected to side plates 220 whose lower extending portion includes a slot 222 which, as shown, has one end open. As depicted, the slot 222 has an end with an arcuate support surface adapted to engage and rest on an upper or outer pin 224. This pin like an adjacent, inwardly disposed pin 226 is mounted in and extends from the side of support 230. In its mounted condition and with the connecting links drawn tightly and connected the preform is supported by pins 224 and is prevented from rotative movement around the pin 224 by pin 226 which is sized so as to engage both sides of the slot. Where desired, slot 222 may be made sufficiently deep so that the underside of preform 212 may rest on the prepared periphery of support 230.

Figure 18C:
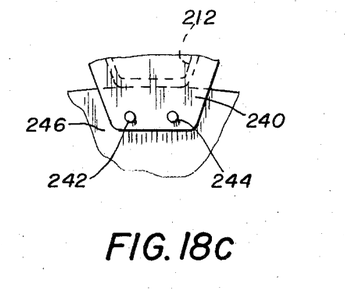

In FIG. 18C side plate 240 is made with a pair of holes which engage pins 242 and 244 formed in the side portion of support 246. As with the embodiments of FIGS. 18A and B the preform 212 may or may not engage the support member depending on the placement of the holes for pins 242 and 244. As shown, one portion of the underside of the preform is allowed to engage the periphery of the support 246.

Figure 18D:
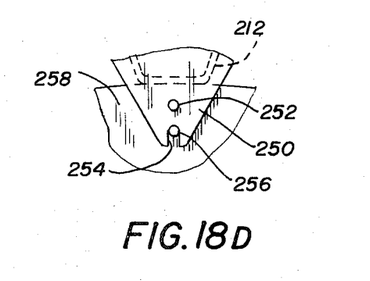

In FIG. 18D side plate 250 has a hole adapted to engage pin 252 and a slot 254 adapted to engage the sides of pin 256. Pins 252 and 256 are carried in the side of support 258. Whether the preform 212 is allowed to engage the support as shown or is supported so as to be spaced from the support member periphery is merely a matter of selection.

In FIGS. 18A, B, C and D there is disclosed the concept of supporting and positioning the preform by pins engaging either holes, slots or combinations thereof as formed in the side plate portions of the preform. In all of the above examples the preform, although connected by pivotal means to the adjacent preform, is brought to a condition of immobility when secured to the support member. The loosening of the link connecting means permits replacement, repair or change of pitch line or spacing of preforms by merely changing components.

ASSEMBLY AND USE OF THE PREFORMS AS ABOVE-DESCRIBED

Whether the preform has a tooth or a trough member or even combinations thereof or has a configuration which may be used with roller chain to provide a sprocket adapted for roller chain, the present invention contemplates that the several preforms are supported on and by their underside configurations so as to be precisely positioned by a support base. Alternately the preform may be supported by screws or pins carried in the support. These screws or pins engage holes or slots formed in the side plate portions. The resulting drive or driven transmission member is adapted to mesh with the driven or driving member such as a sprocket, a gear or chain or a timing belt. It is further contemplated that the depicted preforms may be retained in a precise spaced position by means of tight link connecting means while the preforms on the support member may be retained by means of epoxy cements or by brazing or soldering some or all of the units to the base so that a non-slip condition is established. It is also contemplated that a resilient or partly resilient surface applied to the periphery of the base member may provide a seating medium for the preforms which will accommodate small errors in the forming of the peripheries. This prepared support surface, when a complete connection of the series of preforms is made and brought into a very tight relationship, provides intimate seating means that insures that the spacing of one preform to the next is the desired spacing and that no play will be developed between the preforms and the support member.

Assembly of a series of several preforms to a base member is very rapid and only requires that the base member be made with desired periphery of a precise diameter. The retaining holes in the support member are preferably made before mounting and at a determined distance from the support surface. As an alternate method the holes in the support member may be located from a mounted side plate by using the hole as a drill template. After the hole is made a drive pin is used to secure the side plate. The width of the support member is, of course, important in that all the preforms have downwardly extending side plate portions which are contemplated to accommodate the side surfaces of the support member. Preferably a snug engagement of the side plates to the support member is made to prevent any undue side play and undue strain upon the link plates connecting the preforms one to the other.

In the manner of roller chain tighteners this or like equipment is contemplated to be used so that the ends of the preforms and links are brought to a desired connecting position. Connecting pins like connecting pins 102, for example, are placed in the aligned holes and the now connected unit is tightly secured to the base member. The preform may be cammed into place as in FIGS. 15, 17 and like combinations. Whether the preform is made as a casting, welding or as an assembled unit is merely a matter of selection, however, precision in all units is a necessary quality since the preform must be seated and maintained on the supporting surface of the support member or in pins carried therewith in such a manner that it does not rock or twist which would cause wear and destruction in the case of gears. Where the assembly is a timing belt pulley undue wear on the timing belt would occur and the desired accuracy could be destroyed.

The ability and advantage of utilizing the preforms to make irregularly-shaped gears, toothed cams or timing belt pulleys where varying speeds of shafts is desired is achieved by this invention. This versatility enables the designer of equipment requiring special ratios to utilize a length of series connected preforms and a constructed support member to provide a new gear or timing belt pulley having the required characteristics within a very short time. The use of the tooth preform to provide racks and the like is mainly to provide teeth on other members such as quadrant drives and special members required in special types of equipment. Whether the tooth portion of the preform or the trough-like member of the preform is of hardened steel or some other material is merely a matter of selection, however, it is contemplated that the wear qualities of the preform be sufficient to withstand the use expected of the equipment.

In most embodiments it is contemplated that the midmember of the preform as it extends from one side to the other will have its underside precisely formed. This underside in relation to the preform assembly of tooth, groove or like drive member establishes the position and resulting pitch line of the preforms in relation to the prepared support surface. In other instances, as above-described, the midmember is precisely positioned by supporting both side plates of the preform by precisely located pins or screws carried by the support member. The resulting member is a highly functional transmission member good for most operating conditions. The ability to select connecting links of different lengths enables the use of a minimum number of preform sizes while accommodating any desired ratio or size to cooperate with any desired mating member.

The securing of the preform to the support member may be accomplished by a combination of pins, for example, pins in the side plates as in FIG. 1 and in other preforms through the preform midportions as in FIG. 14. Step pulleys and/or gears having a plurality of rows of secured preforms may also be provided as desired. The combinations available are limited only by the result desired by the one assembling the transmission unit. The support surface on the support member may be increased to a desired snug engagement by expanding sleeve apparatus. It is essential that each preform by positively supported in a manner to prevent unwanted movement from its intended position.

It is also to be recognized that the preforms may be made with particular configurations and/or qualities so as to satisfy and supply timing demand responses other than in power transmission. For example, where tooth portions of gears and the like are used to actuated magnetic counters the preform may be made with magnetic responsive teeth or projections. The side members, links and connecting pins used therewith can be made of non-magnetic material. Precision positioning and selective profiles are, of course, available no matter what the materials used as long as the required strength and stability are maintained. In fluidic systems preforms with cutoff actuating portions, apertures, etc. may be provided. These preforms, special or not, enable precise inexpensive assembled actuating members to be constructed.

Terms such as "left", "right", "up", "down", "bottom", "top", "front", "back", "in", "out" and the like are applicable to the embodiments shown and described in conjunction with the drawings. These terms are merely for the purposes of description and do not necessarily apply to the position in which the transmission members utilizing pivotally connected preforms may be constructed or used.

While particular embodiments of the preforms have been shown and described it is to be understood that the invention is not limited thereto since modifications may be made within the scope of the accompanying claims and protection is sought to the broadest extent the prior art allows.

What is claimed is:

1. A transmission member which is sequentially assembled to provide the engaging portion of a positive power transmitting member in which said member has a profiled intermediate section adapted to cooperatively engage the profiled portions of a cooperatively engaged transmission member, said assembled power transmitting member including: (a) a support member having a prepared support means of selected determined width; (b) a preform having a midportion containing a positive power transmitting profile formed in its outwardly facing portion, said profile being a tooth, a groove and the like, said preform having at least two means for precisely engaging the support member to provide a determined support of the power transmitting preform, said preform having opposite side plate portions secured to its midportion, the side plate portions establishing guide means for seating the preform on the support member when the preform is in mounted condition on said support member; (c) means formed in the side plate portions for pivotally interconnecting one preform to an adjacent preform, said means establishing a precise spacing of one preform to an adjacent preform, and (d) means for mounting the preform in a positively seated and supported condition on the support member and to retain the pivotal connections in a fixed and tightened condition to establish a fixed positioning of the preform on the support member.

2. A transmission member as in claim 1 in which side plate portions have downwardly extending portions adapted to slidably engage the sides of the support member and provide a transverse retention of the preform on the support member.

3. A transmission member as in claim 2 in which the downwardly extending side plate portions have open-ended slots formed therein, the slots extending from an outer edge of this downwardly extending portion and inwardly a determined distance so that when the preform is in mounted condition the edges of the slot will locally engage the sides of a pin secured in the support member and extending from the side wall thereof.

4. A transmission member as in claim 3 in which the slot is made with its end opening portion formed as a curved camming surface adapted to engage the extending pin for guidance therealong as the preform is moved into mounted condition.

5. A transmission member as in claim 4 in which the slot and pin placement is so arranged that when the preform slot is fully engaged on the pin, the preform will be in a taut condition establishing the spacing of the pivotal connection of one side plate portion to the adjacent side plate portion.

6. A transmission member as in claim 4 in which the pivotal interconnecting means are link members having holes at both ends, said link members arranged as pairs with one end of a link pivotally secured to one preform and the other end pivotally attached to an immediately adjacent preform.

7. A transmission member as in claim 2 in which the downwardly extending side plate portions have transverse apertures therethrough and in the sides of the support member are formed holes into which securing means such as pins, rivets, screws and the like are mounted after and while passing through the aperture to secure the side plate to the support member.

8. A transmission member as in claim 7 in which each preform has fixedly attached upper side plate portions at, above and outwardly of the transmission engaging surface portion of the preform, these upper side plate portions carrying the pivotally interconnecting means.

9. A transmission member as in claim 8 in which the side plate portions are contoured to provide guide means for retaining and positioning a timing belt and the like.

10. A transmission member as in claim 8 in which the pivotally interconnecting means are separate link members having holes at both ends, said link members arranged as pairs with the one end of a link pivotally secured to one preform and the other end pivotally attached to an immediately adjacent preform.

11. A transmission member as in claim 8 in which the pivotally interconnecting means include a pair of upper ear portions formed on each upper side plate portion, a first ear disposed to lay so that its outer surface is in a determined plane and the second ear disposed to lay in a second plane with its inner surface in a plane substantially coincident with the plane of the outer surface of the first ear, both ears having apertures therein for mounting a retaining pin means to pivotally secure the first ear of one preform to the overlapped second ear of an immediately adjacent preform.

12. A transmission member as in claim 2 in which the retention of the preforms when sequentially assembled to the support member is by a pin means mounted in aligned holes formed in both the preform and in a prepared support surface on the support member.

13. A transmission member as in claim 2 in which the preform includes an intermediate member which contains the profile as a tooth form having a pair of substantially like side plates, one plate fixedly attached to each side of the intermediate member, each side plate having a pair of link attaching holes disposed above the means for supporting the tooth form on the support member and the means for pivotally interconnecting the preforms is a pair of link members mounted by pins secured in the attaching holes.

14. A transmission member as in claim 13 in which the downwardly extending side plate portions have open-ended slots formed therein, the slots extending from an inward edge of this downwardly extending portion and outwardly a determined distance so that when the preform is in mounted condition the edges of the slot will locally engage the sides of a pin secured in the support member and extending from the side wall thereof, the engaged pin providing restraint against displacing movement of the preform on the support member.

15. A transmission member as in claim 13 in which the downwardly extending side plate portions have transverse apertures therethrough and in the sides of the support member are formed holes into which securing means such as pins, rivets, screws and the like are mounted after and while passing through the aperture to secure the side plate to the support member.

16. A transmission member as in claim 2 in which the preform includes an intermediate member which contains the profile having a groove adapted to cooperatively engage a timing belt and the like, said intermediate member having a pair of substantially like side plates, one plate fixedly attached to each side of the intermediate member, each side plate having a pair of link attaching holes disposed above the means for supporting the groove form on the support member and the means for pivotally interconnecting the preforms is a pair of link members mounted by pins secured in the attaching holes.

17. A transmission member as in claim 16 in which the downwardly extending side plate portions have open-ended slots formed therein, the slots extending from an inner edge of this downwardly extending portion and outwardly a determined distance so that when the preform is in mounted condition the edges of the slot will locally engage the sides of a pin secured in the support member and extending from the side wall thereof, the engaged pin providing restraint against displacement and movement of the preform on the support member.

18. A transmission member as in claim 16 in which the downwardly extending side plate portions have transverse apertures therethrough and in the sides of the support member are formed holes into which securing means such as pins, rivets, screws and the like are mounted after and while passing through the aperture to secure the side plate to the support member.

19. A transmission member as in claim 2 in which the preform is supported by its side plate portions which have means formed therein for engaging pins and the like mounted in the sides of the support member.

20. A transmission member as in claim 19 in which the means formed in the side plates are slots.

21. A transmission member as in claim 19 in which the means formed in the side plates are apertures.

22. A transmission member as in claim 2 in which the means for precisely engaging the support member is a preform formed with an inner support disposed on the side opposite the power transmitting profile with said inner surface so constructed as to provide at least one engaging support surface adapted to engage and rest on a prepared support surface of the support member.

23. A transmission member as in claim 22 in which the preform has at least two engaging support surfaces formed on its inner surface.

24. A transmission member as in claim 22 which further includes means formed in each of the side plate portions for engaging pins mounted in the sides of the support member so that the preform is supported by the inner support surface and is prevented from overturn, displacement and the like by the engaged side plate portions and engaged pins.

* * * * *